United States Patent [19]

Breitenfellner et al.

[11] Patent Number: 5,034,439
[45] Date of Patent: Jul. 23, 1991

[54] FLAME-RESISTANT POLYESTER MOULDING COMPOUND

[75] Inventors: Franz Breitenfellner, Bensheim; Thomas Kainmüller, Lindenfels/Odenwald, both of Fed. Rep. of Germany

[73] Assignee: Ciba-Geigy Corporation, Ardsley, N.Y.

[21] Appl. No.: 454,615

[22] Filed: Dec. 21, 1989

[30] Foreign Application Priority Data

Dec. 29, 1988 [CH] Switzerland ............... 4844/88

[51] Int. Cl.$^5$ ............... C08K 5/03; C08K 5/02; C08K 3/22
[52] U.S. Cl. ............... 524/94; 524/114; 524/410; 524/411; 524/412
[58] Field of Search ............... 524/410, 411, 412, 94, 524/114

[56] References Cited

U.S. PATENT DOCUMENTS

| | | | |
|---|---|---|---|
| 3,892,667 | 7/1975 | Touval | 524/410 |
| 4,131,595 | 12/1978 | Breitenfellner et al. | 524/539 |
| 4,786,663 | 11/1988 | Miyashita et al. | 524/410 |

FOREIGN PATENT DOCUMENTS

| | | |
|---|---|---|
| 0157426 | 10/1985 | European Pat. Off. . |
| 0174826 | 3/1986 | European Pat. Off. . |
| 58-198543 | 11/1983 | Japan . |
| 59-96158 | 6/1984 | Japan . |
| 59-96159 | 6/1984 | Japan . |
| 59-217738 | 12/1984 | Japan . |
| 61-203164 | 9/1986 | Japan . |

OTHER PUBLICATIONS

Plastics Compounding, May/Jun. 85, p. 106.

*Primary Examiner*—Veronica P. Hoke
*Attorney, Agent, or Firm*—JoAnn Villamizar

[57] ABSTRACT

Flame-resistant polyester moulding compounds comprising
(A) 70–95% by weight of a specific polyester mixture made up of polyethylene terephthalate, polybutylene terephthalate copolyester with 3–30 mol % of an aliphatic dicarboxylic acid containing up to 36 C atoms, and, if desired, polybutylene terephthalate, and
(B) 30–5% by weight of a flame-retardant additive made up of a bromine-containing organic compound and an antimony compound selected from the group comprising $Sb_2O_5$, $NaSbO_3$ and $Sb_2O_3$, with a mean particle size of not less than 2 μm, are particularly suitable for the production of partially crystalline mouldings by means of injection moulding. The mouldings are distinguished by a light self-colour with comparatively good thermal, mechanical and electrical properties.

17 Claims, No Drawings

FLAME-RESISTANT POLYESTER MOULDING COMPOUND

The invention relates to flame-resistant polyester moulding compounds, to the use thereof for the production of partially crystalline mouldings with a light self-colour by means of injection moulding, and to the mouldings produced therefrom.

Polyester mixtures based on polyethylene terephthalate and on copolyesters of butane-1,4-diol, terephthalic acid and an aliphatic dicarboxylic acid are known e.g. from U.S. Pat. No. 4,131,595. In the flame-resistant form, however, their melt becomes increasingly grey when it is processed, especially by means of injection moulding.

To make thermoplastic polyesters flame-retardant, organic halogen compounds, especially bromine compounds, in combination with antimony compounds, especially antimony trioxide, are added to the moulding compounds. The mean particle size of the $Sb_2O_3$ conventionally used is about 1 $\mu$m. Antimony pentoxide is also used. In colloidal form, it has a mean particle size of less than 0.1 $\mu$m. On account of their small mean particle size, these particularly finely divided antimony compounds have a strong synergistic action on the flame retardancy of plastics and only a slight effect on the mechanical properties of the moulding compounds, which is why it is preferred to use them.

When these antimony compounds are used in polyester mixtures containing polyethylene terephthalate and certain copolyesters, the melt is seen to become grey with increasing processing time. This greying is further exacerbated in the presence of phosphites, which are often added to such moulding compounds as stabilizers. The mouldings produced from such moulding compounds therefore have a grey self-colour rather than the desired light self-colour.

It has now been found, surprisingly, that this problem can be solved by using antimony compounds with a mean particle size of not less than 2 $\mu$m.

The present invention relates to flame-resistant polyester moulding compounds comprising (A) 70–95% by weight of a polyester mixture made up of
   (A1) 50–95% by weight of polyethylene terephthalate (PET) or a blend of polyethylene terephthalate and polybutylene terephthalate (PBT), polyethylene terephthalate representing at least 50% by weight of component (A1), and
   (A2) 50–5% by weight of a polybutylene terephthalate copolyester (co-PBT) of butane-1,4-diol, terephthalic acid and 3–30 mol % of an aliphatic dicarboxylic acid of formula I $$HO_2C—R^1—CO_2H \qquad (I)$$

wherein $R^1$ is $C_1$–$C_{34}$alkylene, and (B) 30–5% by weight of a flame-retardant additive made up of (B1) 50–85% by weight of a bromine-containing organic compound and (B2) 50–15% by weight of an antimony compound selected from the group comprising $Sb_2O_5$, $NaSbO_3$ and $Sb_2O_3$, with a mean particle size of not less than 2 $\mu$m, the percentages by weight of components (A1) and (A2) being based on the total weight of component (A), the percentage by weight of components (B1) and (B2) being based on the total weight of component (B) and the percentages by weight of components (A) and (B) being based on the total weight of components (A) and (B).

According to the present patent application, mean particle size will be understood as meaning the median value of the particle size distribution as determined by means of a laser granulometer (Cilas principle of measurement) using laser light diffraction, i.e., the size of 50% by weight of the particles is above or below this value. Measurement by means of a sedigraph during sedimentation is a further possibility.

Although, according to the state of the art, antimony compounds of small particle size (mean particle size ≦1 $\mu$m) are generally used in polyester mixtures, a few literature references are known which disclose certain polyester mixtures with a mean particle size of more than 1 $\mu$m.

Japanese published patent application 96,159/1984 discloses mixtures of substances comprising a thermoplastic polyester, an organic halogen compound, $Sb_2O_3$ with a mean particle size of not less than 1 $\mu$m, and an ester of an organic acid, especially an end-capped polycaprolactone. Mixtures of substances in which the polyester component is polyethylene terephthalate or a polyethylene terephthalate/polybutylene terephthalate mixture are specifically disclosed. When these mixtures of substances are used, less flashing is observed in the production of the mouldings. The same advantage is also asserted in related Japanese published patent application 96,158/1984, which discloses mixtures of substances comprising a thermoplastic polyester, a halogen-containing flame retardant with a molecular weight of at least 1000, and $Sb_2O_3$ with a mean particle size of 1–10 $\mu$m. Mixtures in which the polyester component is polyethylene terephthalate or polybutylene terephthalate are specifically disclosed.

Japanese published patent application 217,738/1984 discloses mixtures of substances comprising a synthetic resin, a flame retardant and an antimony oxide with a mean particle size of 1–4 $\mu$m. The mixtures of substances are distinguished by a greater temperature processing range in injection moulding and by good mechanical properties and a better surface appearance. The synthetic resin can be selected from a large number of thermoplastics or thermosetting plastics, it being preferred to use polyalkylene terephthalates, especially polyethylene terephthalate modified by crystallization accelerators.

European patent application A 174,826 claims mixtures of substances comprising polybutylene terephthalate, a flame retardant and an antimony trioxide with a mean particle size of at least 1 $\mu$m. Fibre-reinforced mixtures are especially preferred. To prevent the deformation of the mouldings which is observed in this case, it is preferred to add polycarbonate to the mixtures, even though this greatly reduces the stability of the mixtures in the melt. This problem is solved according to European patent application A 174,826 by using antimony trioxide of the particle size defined above.

British patent application 2,186,878 discloses mixtures of substances comprising thermoplastic polyesters, organic halides and sodium antimonate with a mean particle size of 0.5–50 $\mu$m and with a characteristic X-ray diffraction pattern. The specific sodium antimonate is obtained by heating sodium antimonate starting material. Polyesters mentioned are, inter alia, polyethylene and polybutylene terephthalate and mixtures thereof.

The mixtures of substances exhibit good mechanical properties and a high heat stability.

None of the above-mentioned publications gives any indication of the problem to be solved by the present invention, namely that of the greying of certain flame-resistant polyester materials, or of the solution to the problem, provided by the invention, involving the use of antimony compounds of a certain particle size.

In contrast to the few above-mentioned publications expressing various preferences for mixtures of substances in which the antimony compounds present have a large mean particle size, the state of the art otherwise relates, without exception, to the use of antimony compounds with a small mean particle size.

As disadvantages of using antimony oxide with larger particle sizes, Japanese published patent application 198,543/1983, for example, cites reduced mechanical properties and impaired flame retardancy; according to said document, antimony oxide with a mean particle size of 0.1–0.6 μm should be used. Neither of these disadvantages is observed with the moulding compounds of the invention.

In Plastics Compounding, May/June 1985, pages 106–117, I. Touval describes the effect of the particle size of $Sb_2O_3$, $Sb_2O_5$ and $NaSbO_3$ on the colour strength and physical properties of plastics which have been rendered flame-resistant with said compounds. According to this author, it is precisely the coarser types of $Sb_2O_3$ which cannot be expected to produce any particular whitening effects which could be capable of masking a discolouration of the product. In the mean particle size range from 0.1 to 10 μm, the white pigmentation effect or the colour strength is the greater, the smaller the particle size.

Polyester components (A1) and (A2) suitable for the moulding compounds of the invention are known. The polybutylene terephthalate copolyester component (A2) is preferably crystalline or partially crystalline, in which case it has melting points of at least 150° C. in particular. It can also be present in amorphous form, however, in which case the copolyester preferably has a glass transition temperature below 40° C., especially below 25° C. The viscosity number (according to DIN 53728/3) of the polyesters (A1) and (A2) is preferably at least 50 (cm³/g), especially at least 70 (cm³/g).

The moulding compounds of the invention preferably contain 75–90% by weight of the polyester mixture (A) and 25–10% by weight of the flame-retardant additive (B).

The polyester mixture (A) preferably consists of 70–90% by weight of component (A1) and 30–10% by weight of component (A2), component (A1) preferably containing at least 65, especially at least 80% by weight, of polyethylene terephthalate.

The co-components used in the case of the polybutylene terephthalate copolyester (A2) can be randomly distributed or the copolymers can be block polymers. Random copolymers are preferred.

The copolyester component (A2) preferably contains 5–25, more preferably 7–25 and most preferably 10–20 mol % of the aliphatic dicarboxylic acid of formula I.

The $C_1$–$C_{34}$alkylene radical of the compounds of formula I can be branched or, preferably, linear. Examples of suitable dicarboxylic acids of formula I are pentylmalonic acid, octadecylmalonic acid, glutaric acid, succinic acid, octadecylsuccinic acid, pimelic acid, suberic acid, adipic acid, trimethyladipic acid, azelaic acid, sebacic acid, dodecanedioic acid, dodecanedicarboxylic acid, pentadecanedicarboxylic acid, octadecanedicarboxylic acid and dimeric acids. Dimeric acids are dimerization products of unsaturated carboxylic acids, e.g. oleic acids. Such copolyesters based on polybutylene terephthalate are disclosed e.g. in German Offenlegungsschrift 2,340,959.

It is preferred to use dicarboxylic acids of formula I wherein $R^1$ is linear $C_4$–$C_{10}$alkylene.

Especially preferred dicarboxylic acids are dodecanedioic acid, azelaic acid or, in particular, sebacic acid or adipic acid.

The flame-retardant additive (B) of the moulding compounds of the invention preferably consists of 65–80% by weight of component (B1) and 35–20% by weight of component (B2).

Flame retardants based on bromine-containing organic compounds are known. Examples of suitable flame retardants are brominated polystyrenes such as polytribromostyrene and polypentabromostyrene, e.g. Pyrocheck® 60 PB and 68 PB from Ferro, decabromobiphenyl, tetrabromobiphenyl, hexabromodiphenyl ether, octabromodiphenyl ether, decabromodiphenyl ether, tetrabromodiphenyl sulfide, hexabromodiphenyl sulfone, tetrabromobenzimidazolone, brominated α,ω-alkylene-bis-phthalimides, e.g. N,N'-ethylene-bis-tetrabromophthalimide marketed by Ethyl Corporation as Saytex® BT-93, brominated poly(benzyl acrylates) such as poly(pentabromobenzyl acrylate) (FR-1025 from Eurobrom), oligomeric brominated carbonates, especially carbonates derived from tetrabromobisphenol A, which, if desired, are end-capped with phenoxy radicals, e.g. BC-52, or with brominated phenoxy radicals, e.g. BC-58 from Great Lakes, or brominated epoxy resins, e.g. the products F-2400 and F-2300 from Makteshim (Beer-Sheva, Israel). Other organic bromine compounds are disclosed e.g. in German Offenlegungsschrift 2,242,450.

Preferred components (B1) of the moulding compounds of the invention are brominated α,ω-alkylene-bis-phthalimides, oligomeric brominated carbonates, brominated epoxy resins or, in particular, brominated polystyrenes or brominated poly(benzyl acrylates).

Polytribromostyrene is most preferred.

The antimony compound (B2) is preferably $NaSbO_3$ or, in particular, $Sb_2O_5$.

The antimony compounds (B2) preferably have a mean particle size of 2–40, more preferably 2–25 and most preferably 3–25 μm. Especially preferred mean particle sizes are 3 μm or 15 μm for $Sb_2O_3$, 2μm for $NaSbO_3$ and 3μm or 18 μm for $Sb_2O_5$.

The antimony compounds as defined can be added to the moulding compound as such in powder form, or in the form of a masterbatch, e.g. at a concentration of 80% in polyethylene or polybutylene terephthalate.

In addition to components (A) and (B), the moulding compounds of the invention can also contain (C) 5–50, preferably 10–40% by weight, of glass fibres, based on the total weight of the moulding compound. These can be coated with a primer to improve their adhesion to the polyester.

The polyesters used in the moulding compounds of the invention are known and commercially available or they can be prepared by polycondensation processes known in the art.

The moulding compounds of the invention are also prepared according to methods conventionally used in the art, by incorporation of the additives into the polyester, e.g. by regranulation.

Other conventional additives can also be used, e.g. other fillers such as talc, mica, metal powder, silicic acid aerosol, kaolin, calcium carbonate, dolomite, xonotlite, magnesium sulfate, calcium phosphate, silicates or glass spheres, inorganic or organic pigments, fluorescent whitening agents, dulling agents, lubricants, mould release agents, crystallization promoters, antioxidants, light stabilizers and processing stabilizers.

Especially preferred amoung these additives are fillers such as kaolin, talc or dolomite, which can represent up to ca. 35% by weight of the total material, as well as other additives for improving the electrical properties and flame retardancy and reducing the corrosive action on contact metals, such as xonotlite or tricalcium phosphate. These are preferably used in amounts of ca. 1–4 or, respectively, 1% by weight, based on the total material. The total amount of these particulate additives should preferably not exceed 40% by weight of the total material, while the total amount of the glass fibres and particulate fillers should preferably be not more than 60% by weight and, in particular, not more than 50% by weight of the total material.

Examples of suitable antioxidants and stabilizers are sterically hindered phenols such as Irganox® 1035 or Irganox® 1076 from Ciba-Geigy, phosphites such as tris(nonylphenyl) phosphite (Irgafos® TNPP from Ciba-Geigy), Irgafos® 168 from Ciba-Geigy or Ultranox® 626 from Borg-Warner. Examples of suitable light stabilizers are benztriazoles such as Tinuvin® 326 from Ciba-Geigy.

The moulding compounds can be processed to form all kinds of basic commodities by customary shaping processes such as casting, compression moulding, injection moulding and extrusion. Examples of such articles are technical apparatus components, apparatus housings, household appliances, sports equipment, electrical insulators, car components, circuits, boards, films and semifinished products which can be machined. One particular field of application is the production of mouldings or coatings for electrical engineering and electronics.

The moulding compounds of the invention are particularly suitable for injection moulding. For this reason, the invention further relates to the use of the moulding compounds of the invention for the production of partially crystalline mouldings with a light self-colour by means of injection moulding at temperature in the range from 90 to 150, in particular from 110° to 140° C.

The invention further relates to mouldings produced from the moulding compounds of the invention.

The following Examples illustrate the invention. The percentages by weight of the individual components given in the Examples are always based on the total material.

EXAMPLES 1–4

Using a BUSS laboratory kneader (46 mm screw diameter), the components listed in Table 1 are compounded at a temperature of 270° C. After granulation and drying of the granulate, the latter is processed by injection moulding to form test pieces with dimensions of 60×12.5×1.6 mm. The processing conditions on an Arburg Allrounder injection moulding machine are as follows:

Cylinder temperature: 270° C.
Mould temperature: 130° C.
Cycle time: 18 sec.

The moulding compounds of the invention produce mouldings with a light self-colour and a smooth surface (Examples 3 and 4). The light self-colour is preserved even when processing is continued.

Mouldings of Comparative Examples 1 and 2 have a grey self-colour which darkens with increasing processing time.

TABLE 1

| Example no. | Composition | Observation |
| --- | --- | --- |
| 1 (comparison) | 42.0% by weight of PET (1)<br>10.5% by weight of co-PBT with 17.6 mol % of sebacic acid (2)<br>12.5% by weight of polytri bromostyrene<br>5.0% by weight of Sb$_2$O$_3$, mean particle size 1 [2m (3)<br>30.0% by weight of glass fibers | The mouldings have a grey self-colour which darkens with increasing processing time |
| 2 (comparison) | as 1 but<br>5.0% by weight of Sb$_2$O$_5$, mean paticle size 0.03 μm (4) | as 1 |
| 3 | as 1 but<br>5.0% by weight of Sb$_2$O$_3$, mean particle size 15 μm (3) | Mouldings with light self-colour |
| 4 | as 1 but<br>5.0 by weight of Sb$_2$O$_5$, mean particle size 18 μm (3) | as 3 |

(1) Viscosity number according to DIN 53 728, part 3: 125 cm$^3$/g
(2) Viscosity number according to DIN 53 728, part 3: 165 cm$^3$/g
(3) Measured by means of laser light diffraction on a Cilas HR 850 granulometer from Cilas-Alcatel
(4) According to manufacturer's data

EXAMPLES 5–11

The compositions listed in Table 2 are granulated in the same manner. At a cylinder temperature of 270° C. and a mould temperature of 130° C., test pieces with dimensions of 60×12.5×1.6 mm (cycle time 18 sec) are produced for assessment of the discolouration. The materials are also processed to form test pieces for determination of the flexural strength (dimensions 180×10×4 mm, cycle time 35 sec) and for determination of the flammability (125×12.5×1.6 mm, cycle time 28 sec). According to UL-94, mouldings produced from the moulding compounds of the invention (Examples 6–8, 10 and 11) exhibit class V-O self-extinguishing properties and are distinguished by their high strength. They are found to be colour-stable during processing. By contrast, the mouldings obtained according to Examples 5 and 9 (comparison) have a grey self-colour which becomes even more pronounced with increasing processing time.

EXAMPLES 12–14

The compositions listed in Table 3 are granulated in the same manner. At a cylinder temperature of 270° C. and a mould temperature of 85° C., test pieces with dimensions of 60×12.5×1.6 mm (cycle time 18 sec) are produced for assessment of the discolouration.

Mouldings produced from the moulding compounds of the invention (Examples 13 and 14) are distinguished by a light beige colour and are found to be colour-stable during processing. According to Comparative Example 12, on the other hand, only mouldings with a light grey self-colour are obtained, which darkens with increasing processing time.

TABLE 2

| Example no. | Composition | Flammability UL 94 | Flexural strength according to DIN 53453 (N/mm$^2$) | Observation |
| --- | --- | --- | --- | --- |
| 5 (comparison) | 42.0% by weight of PET (1)<br>5.5% by weight of PBT (2)<br>5.5% by weight of co-PBT with 17.6 mol % sebacic acid (3)<br>5.0% by weight of dolomite<br>2.0% by weight of xonotlite<br>8.0% by weight of polytribromo-styrene<br>2.0% by weight of Sb$_2$O$_5$, mean particle size 0,03 μm (4)<br>30.0% by weight of glass fibers | V-O | 195 | Mouldings have a grey self-colour |
| 6 | as 5 but<br>2.0% by weight of Sb$_2$O$_5$, mean particle size 18 μm (5) | V-O | 193 | Mouldings have a light self-colour |
| 7 | as 5 but<br>2.0% by weight of Sb$_2$O$_3$, mean particle size 15 μm (5) | V-O | 195 | as 6 |
| 8 | as 5 but<br>2.0% by weight of NaSbO$_3$, mean particle size 2 μm (5) | V-O | 194 | as 6 |
| 9 (comparison) | as 5 but<br>2.0% by weight of Sb$_2$O$_3$, mean particle size of 1 μm (4) | V-O | — | Greying of the test pieces increases with increasing processing time |
| 10 | as 5 but<br>2.0% by weight of Sb$_2$O$_3$, mean particle size 3 μm (4) | V-O | — | Mouldings have a light beige self-colour which is preserved even after 35 injection cycles |
| 11 | as 5 but<br>2.0 by weight of Sb$_2$O$_5$, mean particle size 3 μm (4) | V-O | — | as 10 |

(1) Viscosity number according to DIN 53 728, part 3: 125 cm$^3$/g
(2) Viscosity number according to DIN 53 728, part 3: 110 cm$^3$/g
(3) Viscosity number according to DIN 53 728, part 3: 165 cm$^3$/g
(4) According to manufacturer's data
(5) Measured by means of laser light diffraction on a Cilas HR 850 granulometer from Cilas-Alcatel

TABLE 3

| Example no. | Composition (6) | Observation |
| --- | --- | --- |
| 12 (comparison) | 40 parts by weight of PET (5)<br>40 parts by weight of co-PBT with 5 mol % of sebacic acid (1)<br>13 parts by weight of oligomeric brominated carbonate<br>4 parts by weight of Sb$_2$O$_3$, mean particle size 1 μm (4) | Mouldings have a light grey self-colour which darkens with increasing processing time |
| 13 | 40 parts by weight of PET (5)<br>40 parts by weight of co-PBT with 3 mol % of sebacic acid (2)<br>13 parts by weight of oligomeric brominated carbonate<br>4 parts by weight of Sb$_2$O$_3$, mean particle size 3 μm (4) | Mouldings have a light beige self-colour which darkens only slightly with increasing processing time |
| 14 | 40 parts by weight of PET (5)<br>40 parts by weight of co-PBT with 7 mol % of sebacic acid (3)<br>13 parts by weight of oligomeric brominated carbonate | Mouldings have a light beige self-colour which is preserved even with increasing processing time |

TABLE 3-continued

| Example no. | Composition (6) | Observation |
|---|---|---|
| | 4 parts by weight of $Sb_2O_3$, mean particle size 3 μm (4) | |

(1) Viscosity number according to DIN 53 728, part 3: 151 $cm^3/g$
(2) Viscosity number according to DIN 53 728, part 3: 146 $cm^3/g$
(3) Viscosity number according to DIN 53 728, part 3: 165 $cm^3/g$
(4) According to manufacturer's data
(5) Viscosity number according to DIN 53 728, part 3: 125 $cm^3/g$

What is claimed is:

1. A flame-resistant polyester moulding compound comprising
   (A) 70-95% by weight of a polyester mixture made up of
      (A1) 50-95% by weight of polyethylene terephthalate or a blend of polyethylene terephthalate and polybutylene terephthalate, polyethylene terephthalate representing at least 50% by weight of component (A1), and
      (A2) 50-5% by weight of a polybutylene terephthalate copolyester of butane-1,4-diol, terephthalic acid and 3-30 mol % of an aliphatic dicarboxylic acid of formula I $$HO_2C—R^1—CO_2H \quad (I),$$

wherein $R^1$ is $C_1$-$C_{34}$alkylene, and
   (B) 30-5% by weight of a flame-retardant additive made up of
      (B1) 65-80% by weight of a bromine-containing organic compound and
      (B2) 35-20% by weight of an antimony compound selected from the group comprising $Sb_2O_5$, $NaSbO_3$ and $Sb_2O_3$, with a mean particle size of 2-40 μm,
   the percentages by weight of components (A1) and (A2) being based on the total weight of component (A), the percentages by weight of components (B1) and (B2) being based on the total weight of component (B) and the percentages by weight of components (A) and (B) being based on the total weight of components (A) and (B) being based on the total weight of components (A) and (B).

2. A moulding compound according to claim 1 comprising 75-90% by weight of component (A) and 25-10% by weight of component (B).

3. A moulding compound according to claim 1, wherein the polyester mixture (A) consists of 70-90% by weight of component (A1) and 30-10% by weight of component (A2).

4. A moulding compound according to claim 1, wherein polyethylene terephthalate represents at least 65% by weight of component (A1).

5. A moulding compound according to claim 4, wherein polyethylene terephthalate represents at least 80% by weight of component (A1).

6. A moulding compound according to claim 1, wherein component (A2) contains 5-25 mol % of the aliphatic dicarboxylic acid of formula I.

7. A moulding compound according to claim 1, wherein $R^1$ is linear $C_4$-$C_{10}$-alkylene.

8. A moulding compound according to claim 1, wherein the aliphatic dicarboxylic acid is dodecanedioic acid, azelaic acid, sebacic acid or adipic acid.

9. A moulding compound according to claim 8, wherein the aliphatic dicarboxylic acid is sebacic acid or adipic acid.

10. A moulding compound according to claim 1, wherein component (B1) is a brominated α,ω-alkylene-bis-phthalimide, an oligomeric brominated carbonate, a brominated epoxy resin, a brominated polystyrene or a brominated poly(benzyl acrylate).

11. A moulding compound according to claim 1, wherein the antimony compound (B2) is $NaSbO_3$ or $Sb_2O_5$.

12. A moulding compound according to claim 11, wherein the antimony compound (B2) is $Sb_2O_5$.

13. A moulding compound according to claim 1, wherein the antimony compound has a mean particle size of 2-25 μm.

14. A moulding compound according to claim 1 which, in addition to components (A) and (B), also contains (C) 5-50% by weight of glass fibres, based on the total weight of the moulding compound.

15. A moulding compound according to claim 14 which also contains (C) 10-40% by weight of glass fibres, based on the total material.

16. A process for the use of the moulding compound according to claim 1 to produce partially crystalline mouldings with a light self-colour by means of injection moulding at temperatures in the range from 90° to 150° C.

17. A moulding produced from the moulding compound according to claim 1.

* * * * *